INVENTOR.
ALBERT de GRAFFENRIED by Leonard H. King

United States Patent Office 3,160,366
Patented Dec. 8, 1964

3,160,366
OUTER SPACE VEHICLE WITH MEANS CONTROLLING ITS RATE OF ENTERING THE ATMOSPHERE OF A PLANET
Albert de Graffenried, Roslyn Harbor, N.Y., assignor to Avien, Inc., Woodside, N.Y.
Filed July 8, 1960, Ser. No. 41,581
4 Claims. (Cl. 244—1)

This invention relates to space vehicles and means for controlling their rate of entry into the atmosphere surrounding a planet.

Orbiting space vehicles interested in entering the denser atmosphere surrounding the earth or other planets, are subjected to intense heating resulting from friction with and compression of the atmosphere. In order to prevent overheating of the vehicle beyond a safe temperature, it is necessary for the operator of the vehicle to reduce the speed of the vehicle by such means as changing the angle of approach. The operator is interested in limiting the entering rate, namely, the rate at which the vehicle loses *energy*, viz., kinetic energy (due to speed) and potential energy (due to location in the gravity field of a planet). He can do this by making his dive more shallow. This is known in the art as the "skip-glide entry" technique.

An alternative method is to increase the drag of the vehicle. However, at the contemplated entry speeds, namely, in the order of 35,000 feet per second, increased drag would result in a tremendous rise in the temperature of the vehicle surface. The generated heat would exceed the cooling capabilities of presently contemplated cooling systems. Another serious problem is the fact that overheating may cause structural failure.

The problem solved by the present invention is the rapid entry of a space vehicle into the atmosphere surrounding a planet without overheating of the vehicle.

Briefly stated, the device of this invention comprises a variable area trailing sheet which is preferably mounted at the rear of a space vehicle with provision to extend a particular area of the sheet in accordance with the desired rate of energy loss.

In one embodiment of this invention it is contemplated that the amount of exposed area will be controlled automatically by temperature and/or acceleration sensing means. In another embodiment of this invention it is contemplated that the vehicle will maintain maximum entry rate consistent with limitation of temperature to a safe value as determined by strategically located temperature sensing elements and servo means under the control of signals from said temperature sensing elements.

At steep entry angles, which are called "impacting trajectories," the deceleration and the heat transferred to the vehicle are very high ... calling for a blunt-nosed, ablating-type vehicle. An ablating-type vehicle is one in which provision is made for part of the nose-cone surface to boil off during entry into the atmosphere. At shallow entry angles, say zero to 4°, a "grazing trajectory," the situation is quite different. The maximum deceleration experienced occurs at the higher altitudes where the air is thinner, and the magnitude of this deceleration is much lower. Too, the air is so much thinner, that the heat radiated to the vehicle by the surrounding air is much less, simplifying the structural heating problem. The approaching vehicle makes a few grazing passes through the atmosphere, and is slowed down each time. After several of these passes, the speed of the vehicle approaching say, the planet Earth, has decreased to where it can maintain a *near*-Earth orbit as Earth satellites do. Without this atmospheric damping of speed, the vehicle would simply execute a hyperbolic curve about the Earth and swing back out into space.

The above material treats with *non-lifting* type vehicles, that is, those without wings. It is very useful to consider lifting vehicles during the re-entry process, assuming a grazing trajectory. Consider the trajectory of a non-lifting vehicle which executes several grazing intersections with the Earth's atmosphere. With each successive graze, the major axis of the orbit is reduced and the major axis precesses clockwise. For a lifting vehicle, it is possible to enter the atmosphere at a graze, and then use negative lift. The negative lift adds to the gravitational force and, if sufficient lift can be achieved, will make the sum equal to the centrifugal force or at least will extend the duration of the graze, thereby reducing the number of grazes required to reduce the speed of a near-earth-orbit value.

During re-entry, there are several important items which must be noted:

(*a*) The operator of the vehicle wants to keep his "*g*" values down below the level where they will subject him to physical damage.

(*b*) He also wants to minimize heating of his vehicle so that he, as well as the vehicle, are not subjected to excessive heating.

(*c*) On the other hand, he would like to be able to make a prompt entry and be able to land at a particular spot of his choosing.

The use of a Variable-Area Trailing Sheet allows the pilot to control his Lift and Drag independently. This is not so in the case of a flap on an aircraft wing; with each angle of flap setting, there is a given drag and a given lift, and the ratio is fixed, since both vary with V squared. If the drag can be made high enough, then the pilot can make substantial reductions in his forward speed during the first graze. Presumably, he would do this by extending his variable-area trailing sheet to full length and by using sufficient negative lift at a calculated point in space designated as point "A" to assure passing through point "B" in space. At point "B," his gravity force plus negative lift would equal his centrifugal force, and he could curve with the atmosphere making a single-pass entry possible. As his speed decreased, the amount of negative lift required would decrease, the two working together (through a computer) to provide a gradual low-*g*, low-temperature, descent toward the target point.

The key here is the fact that with a large trailing area, a very large rate of dissipation of energy at the higher speeds and higher altitudes can occur, making multiple passes through the atmosphere unnecessary. Another advantage is that the high rate of dissipation occurs *because of a large surface area*, viz, the area of the trailing sheet. Therefore, the radiation of this dissipated energy out into space occurs from said large area. Therefore, since the area is so large, the temperature rise need be considerably less than required to dissipate an equivalent horsepower, assuming that the surface area is limited to that immediately available to the vehicle proper without any trailing area devices.

The fact that large area limits the temperature rise of the vehicle and trailing sheet means that the structure is in less danger of melting. On the other hand, if a very rapid deceleration is desired, the Variable Area Trailing Sheet can be fully extended, and the deceleration monitored by both (1) distributed thermocouples and (2) an accelerometer. This closed control system provides the fastest safe entry. Over a range of initial entry angles, this system should control the drag (as the vehicle penetrates into thicker atmosphere) so that at no time does the vehicle experience say more than 6 *g*'s or 2,000 degrees surface temperature.

There will be some situations where the computer will indicate that there is no "one-pass" solution. This means that the target point is too close to being directly under point "B." The resulting trajectory is outside of the capabilities of the system in which case, it may be necessary to make a 180° turn upon reaching lower altitudes, or simply a wide sweeping turn when the speed is low enough, say Mach 4 at 70,000 feet, etc.

Still other objects and advantages of the invention will in part be obvious and will in part be pointed out with particularity as the following description proceeds taken in conjunction with the accompanying drawings.

Figure 1:
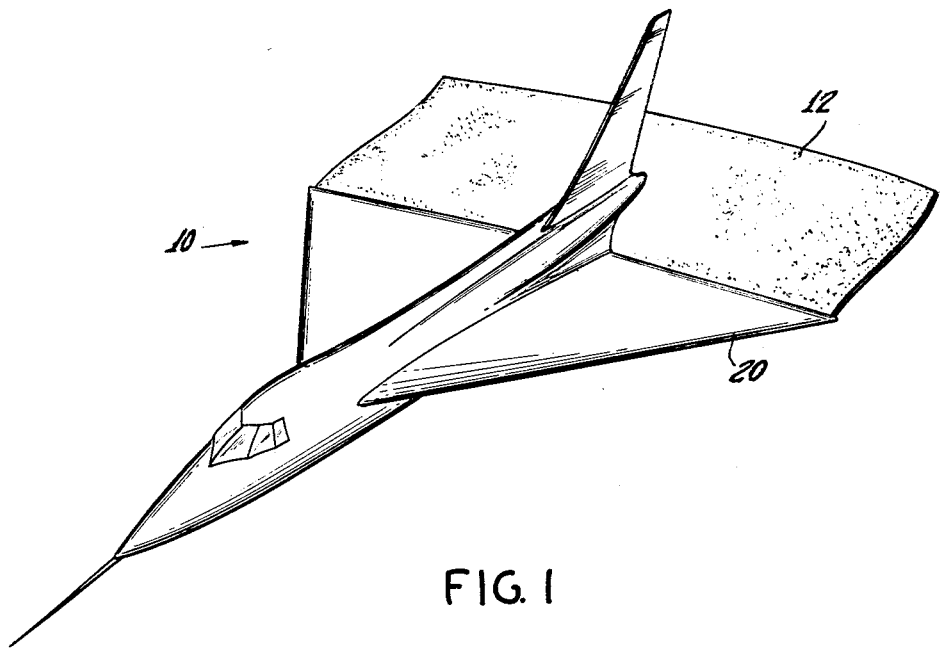
FIG. 1 is a pictorial showing of a space vehicle equipped with an entry-rate control device of this invention making an approach to the surface of a planet.

For a better understanding of the invention, a typical problem will be considered. The vehicle in question may be described as a triangular shaped vehicle approximately 30 feet at the base of the triangle, and having an altitude of 15 feet to 20 feet to the tip. Such a vehicle 10 is shown in FIG. 1. A container at the rear of the vehicle is provided with a rolled-up sheet 12, which in my currently preferred embodiment, consists of a woven fibre glass structure, the fibre glass being used to support a coating of metal deposited on the glass before weaving. Techniques for making such glass are well known in the art and are disclosed, for example, in U.S. Patent 2,916,347. The glass fibre cloth may also be metal-sprayed after weaving to form a metallic layer having high heat emissivity. Considering the entry of the vehicle into the atmosphere of the earth from outer space at 35,000 feet per second, the air density is about $10^7$ molecules per cubic centimeter. The resulting shear stress on a flat plate is about $2 \times 10^{-5}$ dynes per centimeter square. Assuming a trailing sheet, 30 feet wide x 60 feet long, with both surfaces exposed to air molecules, the drag would be 32 dynes. The foregoing calculation is arrived at as follows:

Drag for this sheet is almost entirely viscous; the number of molecules which impinge on each square centimeter of area of the sheet is $n\bar{c}/4$ where: $n$=molecular density, in molecules/cc., $\bar{c}$ is the average speed of the molecules, in cms./sec., and this quantity $n\bar{c}/4$ can be shown to be proportional to the square root of the absolute temperature of the surrounding (virgin) gas, divided into the pressure of the gas, i.e. proportional to $P/\sqrt{T}$. At very high altitudes, the temperature of the sheet should have very little effect on the number of molecules impinging upon said sheet per second, since molecules ejected from the surface of the plate will leave with a velocity considerably higher than the R.M.S. velocity of the virgin gas molecules but will be in the minority amongst bombarding molecules.

Considering the frontal area of the vehicle shown in FIG. 1, as one foot by thirty feet, it will be found that the resulting drag is about 7.5 dynes due to molecules swept out by this area. Adding to this number the surface drag of the vehicle, it will be seen that the drag figures for the vehicle and for the trailing sheet are roughly of the same order of magnitude. This latter figure bears out the feasibility of the invention.

Figure 2:
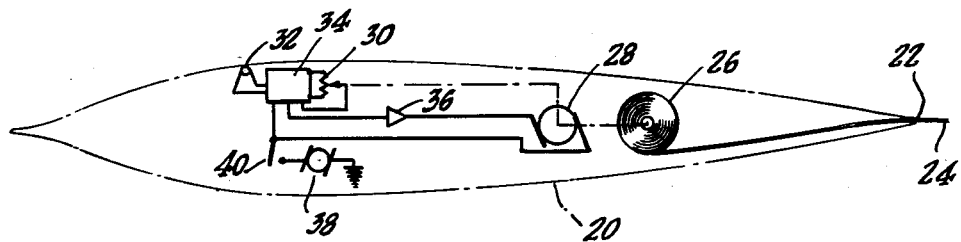
FIG. 2 shows partially pictorially and partially schematically a portion of a space vehicle and associated control equipment.

Referring now to FIG. 2, there is shown in generalized form a portion of the wing 20 of the space vehicle. Extending through an orifice 22 in the aft section, there is a sheet of metalized fabric 24, wound on a supply spool 26 which is controlled by a reversible motor 28. Coupled to motor 28 there is provided a potentiometer 30. Themocouple 32 detects the temperature of the skin of wing 20 and sends the signal to bridge 34, the potential provided by thermocouple 32 is balanced against the output potentiometer 30 to produce an error signal which is amplified by amplifier 36 the output of which is used to drive motor 28. In practice, the single thermocouple 32 is typical of a multiplicity of thermocouples which may be distributed over critical portions of the vehicle. The use of multiple thermocouples is well known in the art. Likewise, the self-balancing type of servo system is well known in the art. A preferred arrangement is disclosed in U.S. Patent No. 2,877,650, issued to Harold Koletsky. The servo system is so phased that the amount of the area of the trailing sheet 24 extended from the vehicle will be a maximum commensurate with maintaining safe-operating temperature. As stated previously, the amount of exposed area may also be controlled automatically by acceleration sensing means or velocity sensing means. The acceleration sensing means or velocity sensing means, if either is employed, may be utilized in cooperation with a portion of the computer, supra, which also determines the gravity force and negative lift required to provide a gradual low-g, low temperature descent towards the target point, to determine a safe acceleration or velocity at the particular altitude through which the vehicle is passing. Thus it will be understood that such means may be substituted in place of thermocouple 32, in which case the servo system of the present invention will operate in like fashion, in this case responding to the acceleration or velocity of the vehicle.

While motor 28 is shown controlling a rolled-up sheet 24, it is to be understood that other storage means may be employed. Thus, for example, the sheet may be stored in the form of loops. The apparatus is connected to power source 38 through switch 40 which may be remotely closed as, for example, by a radio signal from a control station based on the planet. This feature would be useful for an unmanned space vehicle.

What is claimed is:

1. A vehicle for outer space travel employing a flexible variable area heat resistant uniformly surfaced sheet trailing behind said vehicle as a re-entry velocity control means.

2. A vehicle for outer space travel employing a variable area rearwardly extending flexible sheet trailing behind the vehicle, means for sensing the surface temperature of said vehicle, means responsive to said sensing means for automatically varying the exposed area of the sheet so as to maintain the sensed temperature below a predetermined level.

3. A vehicle for outer space travel including an elongated rear apron provided with a slot, a heat resistant, flexible, uniformly surfaced sheet arranged to be extended outwardly through said slot for trailing behind said vehicle, and means for varying the area of said sheet exposed from said vehicle.

4. A device as in claim 3 wherein said flexible sheet comprises a sheet of metalized Fiberglas and wherein said means for varying the exposed area of said sheet comprise a roller disposed within said vehicle and proximate to said elongated rear apron, said sheet being wrapped about said roller, and servo means for rotating said roller responsive to surface temperatures of said vehicle, whereby an automatically controllable portion of said sheet extends outwardly from said slot in said apron.

References Cited by the Examiner

UNITED STATES PATENTS

| | | | |
|---|---|---|---|
| 1,973,389 | 9/34 | Pieper | 40—215 |
| 2,075,788 | 4/37 | Adams | 244—43 |
| 2,262,968 | 11/41 | Schmidt et al. | 244—42 |
| 2,400,388 | 5/46 | Campbell | 244—113 |
| 2,404,895 | 7/46 | Zap | 244—43 |
| 2,419,549 | 4/47 | Griesinger et al. | 244—1 X |
| 2,661,166 | 12/53 | Gordon | 244—42 |
| 2,678,214 | 5/54 | Brewer | 273—105.3 |
| 2,907,095 | 10/59 | Frey | 343—18 |
| 2,950,878 | 8/60 | Fowler | 244—12 |

OTHER REFERENCES

"Space Technology," Aviation Week, Nov. 2, 1959, pages 96–100 and 103.

FERGUS S. MIDDLETON, *Primary Examiner.*

MILTON BUCHLER, *Examiner.*